United States Patent
Latham et al.

(10) Patent No.: US 9,080,003 B2
(45) Date of Patent: Jul. 14, 2015

(54) PROCESS TO PREPARE OPEN CELL FOAMS MADE WITH NATURAL OIL BASED POLYOLS AND POLY(PROPYLENE OXIDE) POLYOLS

(75) Inventors: Dwight D. Latham, Clute, TX (US); Hongming Ma, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/513,111

(22) PCT Filed: Nov. 15, 2010

(86) PCT No.: PCT/US2010/056666
§ 371 (c)(1),
(2), (4) Date: May 31, 2012

(87) PCT Pub. No.: WO2011/071660
PCT Pub. Date: Jun. 16, 2011

(65) Prior Publication Data
US 2012/0238654 A1 Sep. 20, 2012

Related U.S. Application Data

(60) Provisional application No. 61/267,601, filed on Dec. 8, 2009.

(51) Int. Cl.
*C08G 18/24* (2006.01)
*C08G 18/76* (2006.01)
*C08G 18/48* (2006.01)
*C08G 18/18* (2006.01)
*C08G 18/16* (2006.01)
*C08G 101/00* (2006.01)

(52) U.S. Cl.
CPC .......... *C08G 18/4891* (2013.01); *C08G 18/165* (2013.01); *C08G 18/1833* (2013.01); *C08G 18/24* (2013.01); *C08G 18/242* (2013.01); *C08G 18/4812* (2013.01); *C08G 18/4816* (2013.01); *C08G 18/7621* (2013.01); *C08G 2101/0083* (2013.01)

(58) Field of Classification Search
CPC ............................ C08G 18/24; C08G 18/4891
USPC .......................................... 521/170, 174, 172
See application file for complete search history.

(56) References Cited

U.S. PATENT DOCUMENTS

| | | | |
|---|---|---|---|
| 2,866,744 A | 12/1958 | Askey et al. | |
| 3,720,695 A * | 3/1973 | Meisters | 554/116 |
| 3,755,212 A | 8/1973 | Dunlap et al. | |
| 3,821,130 A | 6/1974 | Barron et al. | |
| 3,849,156 A | 11/1974 | Marlin et al. | |
| 4,390,645 A | 6/1983 | Hoffman et al. | |
| 4,423,162 A | 12/1983 | Peerman et al. | |
| 4,633,021 A | 12/1986 | Hanes | |
| 4,731,486 A | 3/1988 | Abatjoglou et al. | |
| 5,010,117 A * | 4/1991 | Herrington et al. | 521/159 |
| 5,171,758 A | 12/1992 | Natoli et al. | |
| 5,451,615 A * | 9/1995 | Birch | 521/132 |
| 5,482,980 A | 1/1996 | Pcolinsky | |
| 6,420,443 B1 * | 7/2002 | Clark et al. | 521/114 |
| 7,268,170 B2 | 9/2007 | Anderson et al. | |
| 2002/0058774 A1 | 5/2002 | Kurth et al. | |
| 2005/0043424 A1 | 2/2005 | Beck et al. | |
| 2006/0160977 A1 | 7/2006 | Ou | |
| 2006/0193802 A1 | 8/2006 | Lysenko et al. | |
| 2006/0293400 A1 * | 12/2006 | Wiltz, Jr. et al. | 521/172 |
| 2009/0264547 A1 * | 10/2009 | Klesczewski et al. | 521/156 |

FOREIGN PATENT DOCUMENTS

| | | |
|---|---|---|
| EP | 1095968 | 2/2005 |
| EP | 1127086 | 1/2008 |
| JP | 43-17592 | 7/1968 |
| WO | 2004096882 | 11/2004 |
| WO | 2004096883 | 11/2004 |
| WO | 2008036173 | 3/2008 |
| WO | 2008144224 | 11/2008 |
| WO | 2009117630 | 9/2009 |
| WO | 2009152304 | 12/2009 |

OTHER PUBLICATIONS

International Search Report and Written Opinion mailed Mar. 3, 2011 for PCT App. No. PCT/us2010/056666.
Journal of Cellular Plastics vol. 27, No. 1 (1991) pp. 97-98.
Machine translation of JP43-17592.

* cited by examiner

*Primary Examiner* — Melissa Rioja
(74) *Attorney, Agent, or Firm* — Whyte Hirschboeck Dudek S.C.

(57) ABSTRACT

Methods of forming olyurethane foams that are the reaction product of at least one polyisocyanate and a polyol composition are provided. The polyol composition includes at least one natural oil based polyol and at least one poly(propylene oxide) polyol and is desirably free of non-natural oil based polyols made from alkylene oxide units, other than propylene oxide units. The natural oil based polyol is present in a quantity sufficient to increase the processing window for the foam relative to a foam made using the same process and the same components, absent the natural oil based polyol. As a result, the present foams can provide very open-cellular structures with the superior performance properties of a poly(propylene oxide) polyol-based foam.

5 Claims, 1 Drawing Sheet

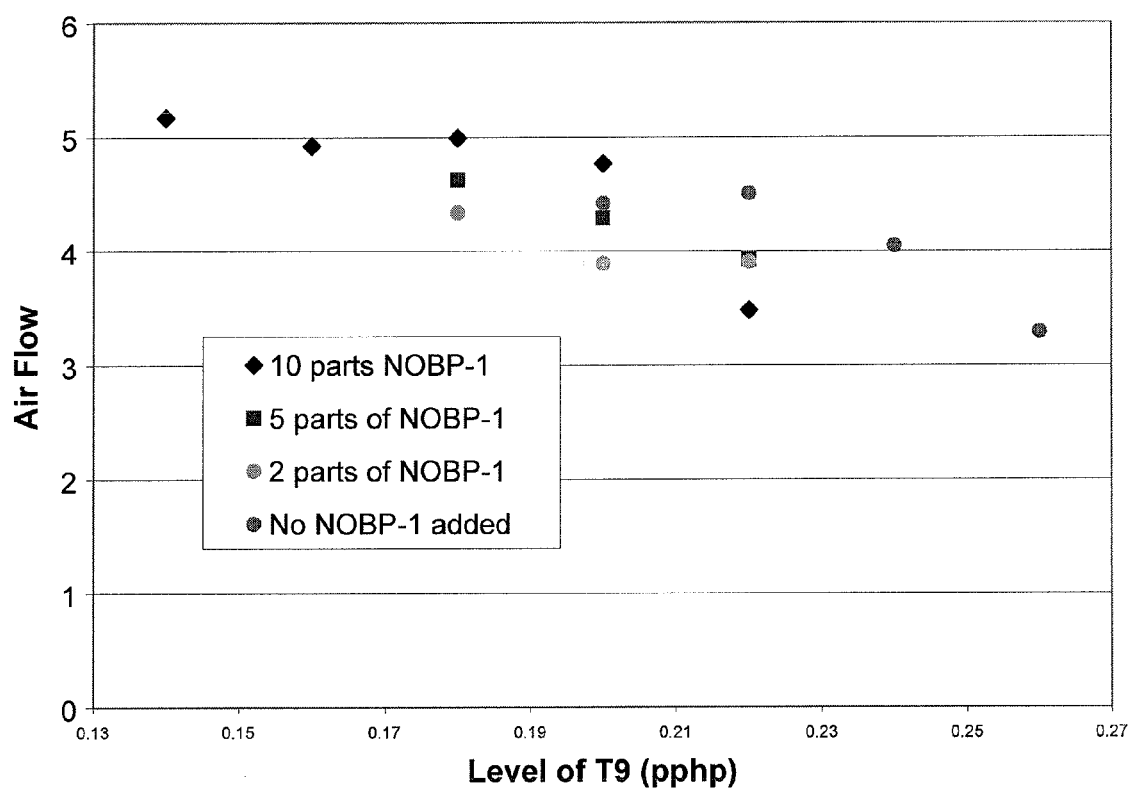

PROCESS TO PREPARE OPEN CELL FOAMS MADE WITH NATURAL OIL BASED POLYOLS AND POLY(PROPYLENE OXIDE) POLYOLS

BACKGROUND OF THE INVENTION

Polyurethane foams made with polyols consisting entirely of poly(propylene oxide) units can have superior performance with respect to some physical properties, such as flame retardance. However, these foams are inherently more difficult to process, having narrow processing windows that result in foams having a more closed cellular structure than desired.

Attempts have been made to make polyols from vegetable or renewable feedstocks such as those disclosed by Peerman et al. in U.S. Pat. No. 4,423,162. Peerman et al. describe hydroformylating and reducing esters of fatty acids obtained from vegetable oils, and forming esters of the resulting hydroxylated materials with a polyol or polyamine. The formation of polyurethane foams from natural oil-based polyols is described in U.S. Pat. Appl. Pub. No. 2006/0293400 and in PCT Appl. No. WO 2008/144224. However, none of these references describes a polyurethane foam formed from polyols consisting entirely of poly(propylene oxide) units and having a highly open cell structure, as measured by air flow rates through the foam. Instead, the examples in these references report foams made from ethylene oxide unit-containing polyols, which are not plagued by narrow processing windows in the same way as polyols consisting entirely of poly(propylene oxide) units.

BRIEF SUMMARY OF THE INVENTION

One aspect of the invention provides a method for forming a polyurethane foam, the method comprising contacting a polyisocyanate with a polyol composition comprising at least one natural oil based polyol (NOBP) and at least one poly(propylene oxide) polyol, in the presence of a tin-based catalyst, a blowing agent and a surfactant, under conditions in which a polyurethane foam is formed. The polyol composition used in the methods is free of non-natural oil based polyols formed from alkylene oxides other than propylene oxide and the natural oil based polyol comprises no greater than 10 weight percent of the polyol composition, such that the tin processing window for the foam extends to lower tin catalyst concentrations relative to a corresponding natural oil based polyol-free foam. In some embodiments, the tin processing window is also broader than the tin processing window for a corresponding natural oil based polyol-free foam.

Some embodiments of the methods provide polyurethane foams having an air flow rate of at least 4 cfm, as measured by ASTM D 3574 Test G. This includes embodiments in which the foams have an air flow rate of at least 4.5 cfm, as measured by ASTM D 3574 Test G and further includes embodiments in which the foams have an air flow rate of at least 5 cfm, as measured by ASTM D 3574 Test G.

In some embodiments, the poly(propylene oxide) polyol used in the methods has an equivalent weight of no greater than about 1200 Da. This includes embodiments in which the poly(propylene oxide) polyol has an equivalent weight of no greater than about 1000 Da.

Polyurethane foams made according to the methods are also provided.

BRIEF DESCRIPTION OF THE DRAWINGS

FIG. 1 shows air flow rates for polyurethane foams, as described in the example.

DETAILED DESCRIPTION OF THE PREFERRED EMBODIMENT

Methods for making polyurethane foams that are the reaction product of at least one polyisocyanate and a polyol composition are provided. The polyol composition includes at least one natural oil based polyol and at least one poly(propylene oxide) polyol and is desirably free of non-natural oil based polyols made from alkylene oxide units, other than propylene oxide units. The natural oil based polyol is present in a quantity sufficient to improve the processing window for the foam relative to a foam made using the same process and the same components, absent the natural oil based polyol. For the purposes of this disclosure, the foam made using the same process and the same components, absent the natural oil based polyol will be referred to as a "corresponding NOBP-free foam." As a result, the present methods provide foams with very open-cellular structures and the superior performance properties of a poly(propylene oxide) polyol-based foam.

The methods comprise contacting a polyisocyanate with a polyol composition comprising at least one natural oil based polyol and at least one poly(propylene oxide) polyol, in which the polyol composition is free from non-natural oil based polyols made from ethylene oxide units, in the presence of a tin-based catalyst, a blowing agent and a surfactant, under conditions in which a polyurethane foam is formed. For example, the polyurethane foams can be prepared by mixing the polyisocyanate and polyol composition in the presence of a blowing agent, surfactant, catalyst(s) and other optional ingredients as desired, under conditions such that the polyisocyanate and polyols react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the polyols to form a prepolymer, which is subsequently reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) can also be used. In such one-shot methods, the polyisocyanate and all polyisocyanate-reactive components are simultaneously brought together and caused to react.

Slabstock foams can be prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun.

The improved processing window (processing latitude) of the foams is evidenced by the ability to prepare a foam without splits and other stability defects while achieving a high porosity in the foam over a broad range of tin catalyst concentrations. Generally, foams are highly prone to splitting when the heat generated from the isocyanate reactions does not yield a sufficiently high exotherm to promote the foaming curing reactions. As a result, there is insufficient gellation to balance the blowing or gas evolution reaction. Eventually, the motive force of the expanding gas bubbles exceeds the tensile strength of the polymer matrix and a physical separation (a split) occurs. To avoid splitting, it is common practice to raise the levels of catalysts, especially tin-based catalyst. However, increasing the catalyst content too much promotes the gellation reaction, increases the strength of the cell membranes, thereby inhibiting cell opening. This results in a more closed cell foam, indicated by reduced air flow, which can lead to foam shrinkage. Thus, a tin processing window can be defined as the range of concentrations of tin catalyst that can produce a foam that is free of splitting, yet has not undergone a degredation of its open cellular structure to the point that the air flow rate through the foam is representative of a closed cell foam. For the purposes of this disclosure, a foam has undergone a degredation of its open cellular structure, if foam shrinkage has occurred due to the pressure differential between atmospheric pressure and the pressure within the cells of the foam, as a result of an increased closed-cell structure. For a foam having a highly open cellular structure, these pressures are the same and no shrinkage occurs. The processing window can be considered closed when the air flow rate through the foam is less than 0.5 cubic feet per minute (cfm), which is representative of a closed cell foam.

Splitting within a foam can be observed after the curing of the foam is complete, by visually inspecting the foam after it has been cut open.

The term "air flow rate" refers to the volume of air which passes through a 1.0 inch (2.54 cm) thick 2 inch×2 inch (5.08 cm) square section of foam at 125 Pa (0.018 psi) of pressure. Units are expressed in cubic decimeters per second and converted to standard cubic feet per minute (cfm). A representative commercial unit for measuring air flow is the FX3300 Air Permeability Tester III available from TEXTEST AG, Zurich Switzerland. The measurement of air flow rates through the foams follows ASTM D 3574 Test G.

In some embodiments, the present methods produce foams that are free of splitting and have an air flow rate of at least 4 cfm, as measured in accordance with ASTM D 3574 Test G. This includes embodiments in which the foams are free of splitting and have an air flow rate of at least 4.5 cfm, and further includes embodiments in which the foams are free of splitting and have an air flow rate of at least 5 cfm, as measured in accordance with ASTM D 3574 Test G.

The Polyol Composition:

The polyol composition from which the foams are made includes at least one natural oil based polyol and at least one poly(propylene oxide) polyol. The polyol composition does not include any non-natural oil based polyols that are formed from (e.g., capped by) alkylene oxide units, other than propylene oxides. In some embodiments, the polyol compositions are substantially free of polyols, other than natural oil based polyols and poly(propylene oxide) polyols. (As used herein, "polyol" refers to an organic molecule having an average of greater than 1.0 hydroxyl groups per molecule. It may also include other functionalities, that is, other types of functional groups.)

Natural Oil Based Polyols (NOBPs):

The present methods are based, at least in part, on the surprising discovery that at sufficiently low concentrations, the presence of one or more natural oil based polyols can have the beneficial effect of increasing the tin processing window for a foam made from poly(propylene oxide) polyols, as well as extending the processing window to lower tin catalyst concentrations. This increased tin processing window is relative to a corresponding NOBP-free foam. Thus, in the case of a foam made from a mixture of one or more natural oil based polyols and a single poly(propylene oxide) polyol, the foam would have an increased processing window relative to a corresponding foam made using the same processing conditions and methods and the same components, with the exception that the natural oil based polyol content is replaced with additional poly(propylene oxide) polyol.

In addition to having an overall increased processing window relative to a corresponding NOBP-free foam, the present foams can also have an increased air flow rate at a given tin catalyst concentration relative to the corresponding NOBP-free foam.

The upper limit for the natural oil based polyol content in the polyol composition can vary to some extent, but in general, it is no greater than (and preferably lower than) 10 weight percent, based on the total weight of the polyols in the composition (e.g., 5 weight percent to 10 weight percent). In some embodiments, the foams are made from a polyol composition that includes no greater than 9 weight percent, no greater than 8 weight percent, no greater than 7 weight percent or no greater that 5 weight percent natural oil based polyol, based on the total weight of the polyols in the composition. At higher natural oil based polyol concentrations, foams having a more closed cellular structure begin to form and foam shrinkage results.

Natural oil based polyols are polyols based on or derived from renewable feedstock resources such as natural and/or genetically modified (GMO) plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of preferred vegetable oils include, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed, or a combination thereof. Examples of animal products include lard, beef tallow, fish oils and mixtures thereof. Additionally, oils obtained from organisms such as algae may also be used. A combination of vegetable, algae, and animal based oils/fats may also be used.

For use in the production of polyurethane foams, the natural material may be modified to give the material isocyanate reactive groups or to increase the number of isocyanate reactive groups on the material. Preferably such reactive groups are hydroxyl groups.

The modified natural oil derived polyols may be obtained by a multi-step process wherein the animal or vegetable oils/ fats are subjected to transesterification and the constituent fatty acids recovered. This step is followed by hydroformylating carbon-carbon double bonds in the constituent fatty acids to form hydroxymethyl groups. Suitable hydroformylation methods are described in U.S. Pat. Nos. 4,731,486 and 4,633,021, for example, and in U.S. Patent Application No. 2006/0193802. The hydroxymethylated fatty acids are herein labeled "monomers" which form one of the building blocks for the natural oil based polyol. The monomers may be a single kind of hydroxymethylated fatty acid and/or hydroxymethylated fatty acid methyl ester, such as hydroxymethylated oleic acid or methyl ester thereof, hydroxymethylated linoleic acid or methyl ester thereof, hydroxymethylated linolenic acid or methyl ester thereof, α- and γ-linolenic acid or methyl ester thereof, myristoleic acid or methyl ester thereof, palmitoleic acid or methyl ester thereof, oleic acid or methyl ester thereof, vaccenic acid or methyl ester thereof, petroselinic acid or methyl ester thereof, gadoleic acid or methyl ester thereof, erucic acid or methyl ester thereof, nervonic acid or methyl ester thereof, stearidonic acid or methyl ester thereof, arachidonic acid or methyl ester thereof, timnodonic acid or methyl ester thereof, clupanodonic acid or methyl ester thereof, cervonic acid or methyl ester thereof, or hydroxymethylated ricinoleic acid or methyl ester thereof. In one embodiment, the monomer is hydroformulated methyloelate. Alternatively, the monomer may be the product of hydroformylating the mixture of fatty acids recovered from transesterification process of the animal or vegetable oils/fats. In one embodiment the monomer is hydoformulated soy bean fatty acids. In another embodiment, the monomer is hydoformulated castor bean fatty acids. In another embodiment, the monomer may be a mixture of selected hydroxymethylated fatty acids or methyl esters thereof. In still other embodiments, the natural oil based polyols may be derived from the direct hydroformylation of vegetable oils.

A polyol is then formed by reacting the monomer with an appropriate initiator compound to form a polyester or polyether/polyester polyol. Such a multi-step process is commonly known in the art, and is described, for example, in PCT Publication Nos. WO 2004/096882 and 2004/096883. The multi-step process results in the production of a polyol with both hydrophobic and hydrophilic moieties, which results in enhanced miscibility with both water and conventional petroleum-based polyols.

The initiator for use in the multi-step process for the production of the natural oil derived polyols may be any initiator used in the production of conventional petroleum-based polyols. Preferably the initiator is selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^2$,6]decene; Dimerol alcohol (36 carbon diol available from Henkel Corporation); hydrogenated bisphenol; 9,9(10,10)-bishydroxymethyloctadecanol; 1,2,6-hexanetriol and combinations thereof. Preferably the initiator is selected from the group consisting of glycerol; ethylene glycol; 1,2-propylene glycol; trimethylolpropane; ethylene diamine; pentaerythritol; diethylene triamine; sorbitol; sucrose; or any of the aforementioned where at least one of the alcohol or amine groups present therein has been reacted with ethylene oxide, propylene oxide or a mixture thereof; and combinations thereof. Preferably, the initiator is glycerol, trimethylopropane, pentaerythritol, sucrose, sorbitol, and/or mixture thereof.

Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-methyl-1,3-propanediamine, N,N-dimethyl-1,3-diaminopropane, N,N-dimethylethanolamine, 3,3'-diamino-N-methyldipropylamine, N,N-dimethyldipropylenetriamine, aminopropyl-imidazole.

In one embodiment, the initiators are alkoxylated with ethylene oxide, propylene oxide, or a mixture of ethylene and at least one other alkylene oxide to give an alkoxylated initiator with a molecular weight between about 200 and about 6000, preferably between about 500 and about 5000. In one embodiment, the initiator has a molecular weight of about 550, in another embodiment, the molecular weight is about 625, and in yet another embodiment, the initiator has a molecular weight of about 4600.

In one embodiment, at least one initiator is a polyether initiator having an equivalent weight of at least about 400 or an average of at least about 9.5 ether groups per active hydrogen group, such initiators are described in Patent Application No. PCT/US09/37751, filed on Mar. 20, 2009, entitled "Polyether Natural Oil Polyols and Polymers Thereof" the entire contents of which are incorporated herein by reference.

The ether groups of the polyether initiator may be in poly(alkylene oxide) chains, such as in poly(propylene oxide) or poly(ethylene oxide) or a combination thereof. In one embodiment, the ether groups may be in a diblock structure of poly(propylene oxide) capped with poly(ethylene oxide).

In one embodiment, a NOPB is made with an initiator or combination of initiators having an average equivalent weight of between about 400 and about 3000 per active hydrogen group. All individual values and subranges between about 400 and about 3000 per active hydrogen group are included herein and disclosed herein; for example, the average equivalent weight can be from a lower limit of about 400, 450, 480, 500, 550, 600, 650, 700, 800, 900, 1000, 1200, or 1300 to an upper limit of about 1500, 1750, 2000, 2250, 2500, 2750, or 3000 per active hydrogen group.

Thus, in this embodiment, at least two of the natural oil based monomers are separated by a molecular structure having an average molecular weight of between about 1250 Daltons and about 6000 Daltons. All individual values and subranges between about 1250 Daltons and about 6000 Daltons are included herein and disclosed herein; for example, the average molecular weight can be from a lower limit of about 1250, 1500, 1750, 2000, 2250, 2500, 2750, 3000, or Daltons to an upper limit of about 3000, 3500, 4000, 4500, 5000, 5500, or 6000 Daltons.

To form the polyether initiator, the active hydrogen groups may be reacted with at least one alkylene oxide, such ethylene oxide or propylene oxide or a combination thereof; or a block of propylene oxide followed by a block of ethylene oxide, to form a polyether polyol. The polyether initiator may be used as an initiator for reaction with at least one natural oil based monomer. Alternatively the initiator is reacted to convert one or more hydroxyl groups to alternative active hydrogen groups.

Thus, in an embodiment, the natural oil based polyol may comprise at least two natural oil moieties separated by a molecular structure having at least about 19 ether groups or having an equivalent weight of at least about 400, preferably both. When the polyether initiator has more than 2 active hydrogen groups reactive with the natural oil or derivative thereof, each natural oil moiety is separated from another by an average of at least about 19 ether groups or a structure of molecular weight of at least about 400, preferably both.

The functionality of the resulting natural oil based polyols can be above about 1.5 and is generally not higher than about 6. In one embodiment, the functionality is below about 4. The hydroxyl number of the natural oil based polyols may be below about 300 mg KOH/g, preferably between about 50 and about 300, preferably between about 60 and about 200. In one embodiment, the hydroxyl number is below about 100.

NOBP 1 of the examples below is an example of a soybean oil based polyol prepared according to example NOPO-1 of WO/2008/144224, entitled "High resilience foams". The monomers are hydroxymethylated soybean fatty acid methyl esters and the initiator is a 625 molecular weight poly(ethylene oxide) triol used at a ratio of monomer to initiator of 4.1:1. The polyol has a hydroxyl number of 89.

Poly(Propylene Oxide) Polyols (PO-Polyols):

As used herein the term "poly(propylene oxide) polyol" is a polyol formed from propylene oxide or a combination thereof, and not having: (1) a part of the molecule derived from a vegetable or animal oil; or (2) alkylene oxide units, other than propylene oxide units, in its backbone or as capping substituents. A poly(propylene oxide) polyol can be prepared by known methods such as by alkoxylation of suitable starter molecules. Such a method generally involves reacting an initiator such as, water, propylene glycol, glycerol, sorbitol or blends thereof with propylene oxide in the presence of a catalyst. VORANOL™ 3022J is an example of suitable poly(propylene oxide) polyol. This polyol is a poly (propylene oxide) polyol with a nominal 3000 molecular weight (1000 equivalent weight), available from the Dow Chemical Company.

The content of poly(propylene oxide) polyol in the polyol composition is desirably sufficiently high to provide a foam with flame retardant properties. Thus, in some embodiments, the foams are classified as flame retardant (with or without the use of additional flame retardants) under one or more of British standard 5852 part 2 (Crib 5), California Technical Bulletin 133 ((Cal 133)), and U.S. Safety Standard MVSS 302.

The lower limit for the poly(propylene oxide) polyol content in the polyol composition can vary. In some embodiments, it is no less than (and preferably greater than) 90 weight percent, based on the total weight of the polyols in the composition. In some embodiments, the foams are made from a polyol composition that includes no less than 91 weight percent, no less than 92 weight percent, no less than 93 weight percent or no less than 95 weight percent poly(propylene oxide) polyol, based on the total weight of the polyols in the composition.

The poly(propylene oxide) polyols desirably have an equivalent weight of no greater than 1200 Da. This includes poly(propylene oxide) polyols having an equivalent weight of no greater than 1000 Da. The equivalent weight is equal to the number average molecular weight of the molecule divided by the combined number of hydroxyl, primary amine and secondary amine groups.

Polyisocyanates:

The organic polyisocyanate used in the formation of the present foams can be a polymeric polyisocyanate, aromatic isocyanate, cycloaliphatic isocyanate, or aliphatic isocyanate. Exemplary polyisocyanates include m-phenylene diisocyanate, toluene-2-4-diisocyanate, toluene-2-6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2-4-diisocyanate, toluene-2-6-diisocyanate or mixtures thereof. Diphenylmethane-4,4'-diisocyanate, diphenylmethane-2,4'-diisocyanate and mixtures thereof are generically referred to as MDI. Toluene-2-4-diisocyanate, toluene-2-6-diisocyanate and mixtures thereof are generically referred to as TDI. Voranate T-80 is an example of a commercially available toluene diisocyanate (80% 2,4-toluene diisocyanate and 20% 2,6-toluene diisocyanate by weight) available from the Dow Chemical Company.

The amount of polyisocyanate used in making the present polyurethane foams can be expressed in terms of isocyanate index, i.e. 100 times the ratio of NCO groups to isocyanate-reactive groups in the reaction mixture (including those provided by water if used as a blowing agent). In the production of the present foams, the isocyanate index can range, for example, from about 50 to 150, especially from about 95 to 115.

Other Components for Foam Formation:

The reaction of the polyisocyanate and the polyols of the polyol composition is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. A common chemical blowing agent is water, which reacts with isocyanate groups to liberate carbon dioxide and form urea linkages. In some embodiments, water is used as the sole blowing agent, in which case typically 1 to 7, especially 2 to 6 parts by weight water are typically used per 100 parts by weight polyol. Water may also be used in combination with a physical blowing agent. In addition, a gas such as carbon dioxide, air, nitrogen or argon can be used as the blowing agent in a frothing process.

A surfactant is also used in the production of the foams. A wide variety of silicone surfactants commonly used in making polyurethane foams can be used in making the present foams. Examples of such silicone surfactants are commercially available under the tradenames Tegostab™ (Th. Goldschmidt and Co.), Niax™ (GE OSi Silicones) and Dabco™ (Air Products and Chemicals, Inc.). For example, Dabco DC 5160 is a suitable silicon surfactant available from Air Products and Chemicals, Inc. The amount of surfactant used will vary somewhat according to the particular application and surfactant that is used, but in general can be between 0.1 and 6 parts by weight per 100 parts by weight polyol, for example.

The formulation used to produce the foams will also include at least one catalyst. The catalysts catalyze the polyol-isocyanate (gelling) reaction, the water-isocyanate (blowing) reaction (when water is used as the blowing agent), or both. In making water-blown foams, it is typical to use a mixture of at least one catalyst that favors the blowing reaction and at least one other that favors the gelling reaction.

The tin based catalysts (i.e., organotin catalysts) used to catalyze the gelling reaction should be used in sufficiently high quantities to avoid split formation in the foams, but sufficiently low quantities to provide a open-cellular structure without significant foam shrinkage. In some embodiments, the tin based catalysts are used in a quantity of no greater than 0.25 parts by weight per 100 parts by weight of polyol (pphp). This includes embodiments in which tin based catalysts are used in a quantity of no greater than 0.2 pphp and further includes embodiments in which tin based catalysts are used in a quantity of no greater than 0.18 pphp. For example, in some embodiments, tin based catalysts are used in a quantity of 0.12 to 0.21 pphp.

Examples of tin-based catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts can be used in conjunction with one or more tertiary amine catalysts. Commercially available organotin catalysts of interest include Dabco™ T-9 and T-95 catalysts (both stannous octoate compositions available from Air Products and Chemicals, Inc.).

A wide variety of materials are known to catalyze polyurethane forming reactions, including tertiary amines, tertiary phosphines, various metal chelates, acid metal salts, strong bases, various metal alcoholates and phenolates and metal salts of organic acids. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts can be used. Examples of suitable commercially available catalysts include Niax™ A-1 (bis(dimethylaminoethyl)ether in propylene glycol available from GE OSi Silicones), Niax™ B9 (N,N-dimethylpiperazine and N—N-dimethylhexadecylamine in a polyalkylene oxide polyol, available from GE OSi Silicones), Dabco™ 8264 (a mixture of bis(dimethylaminoethyl)ether, triethylenediamine and dimethylhydroxyethyl amine in dipropylene glycol, available from Air Products and Chemicals, Inc.), and Dabco™ 33LV (triethylene diamine in dipropylene glycol, available from Air Products and Chemicals, Inc.), Dabco™ BLV (a blend of Dabco™ BL11 (bis(dimethylaminoethyl)ether) and Dabco™ 33LV), Niax™ A-400 (a proprietary tertiary amine/carboxylic salt and bis(2-dimethylaminoethy)ether in water and a proprietary hydroxyl compound, available from GE OSi Silicones); Niax™ A-300 (a proprietary tertiary amine/carboxylic salt and triethylenediamine in water, available from GE OSi Specialties Co.); Polycat™ 58 (a proprietary amine catalyst available from Air Products and Chemicals, Inc.), Polycat™ 5 (pentamethyl diethylene triamine, available from Air Products and Chemicals, Inc.) and Polycat™ 8 (N,N-dimethyl cyclohexylamine, available from Air Products and Chemicals, Inc.). Such catalysts are typically used in small amounts, for example, each catalyst being employed from about 0.0015 to about 5% by weight of the polyols.

Optional Components:

In addition to the foregoing components, the formulations used to make the foams may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

EXAMPLE

This example illustrates the use of natural oil based polyols to expand the processing window for a polyurethane foam made from a poly(propylene oxide) polyol. Table 1 shows the formulations used to make four polyurethane foams. In first foam is a corresponding NOBP-free foam made without any natural oil based polyols.

TABLE 1

Polyurethane foam formulations.

| | Parts | | | |
|---|---|---|---|---|
| VORANOL ™ 3022J | 100 | 98 | 95 | 90 |
| NOBP-1 | 0 | 2 | 5 | 10 |
| Water | 4.5 | 4.5 | 4.5 | 4.5 |
| Dabco BLV | 0.12 | 0.12 | 0.12 | 0.12 |
| DC-5160 | 1 | 1 | 1 | 1 |
| T-9 | vary | vary | vary | vary |
| T-80 | 59.5 | 57.6 | 57.7 | 58.0 |

VORANOL™ 3022J is a poly(propylene oxide) polyol with a nominal 3000 molecular weight, available from the Dow Chemical Company. NOBP 1 is an example of a soybean oil based polyol prepared according to example NOPO-1 of WO/2008/144224, entitled "High resilience foams." Water is used as a blowing agent. Dabco™ BLV (a blend of Dabco™ BL11 (bis(dimethylaminoethyl)ether) and Dabco™ 33LV). Dabco DC 5160 is a silicon surfactant available from Air Products and Chemicals, Inc. Dabco™ T-9 is a stannous octoate catalyst available from Air Products and Chemicals, Inc. Voranate T-80 is a toluene diisocyanate (80% 2,4-toluene diisocyanate and 20% 2,6-toluene diisocyanate by weight) available from the Dow Chemical Company.

Foams having a weight of approximately 1 kg are prepared by mixing all components, except the tin catalyst and isocyanate, for ten seconds at 1800 rpm in a mixer. The tin catalyst is then added, followed by an additional period of mixing for ten seconds at 1800 rpm. Finally, the isocyanate is added and mixed for three seconds at 2400 rpm. The mixture is then poured into a 16 inch×16 inch×14 inch box and allowed to rise. The full rise and blow off times are recorded.

The air flow rate for each of the foams was measured as a function of the tin-based catalyst content and the results are shown in FIG. 1. As shown in this figure, when used in appropriate quantities, the natural oil based polyol results a in foam having a processing window that extends to lower catalyst levels, increased air flow rates, or both, relative to the corresponding NOBP-free foam.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

Numerical ranges include all values from and including the lower and the upper values, in increments of one unit, provided that there is a separation of at least two units between any lower value and any higher value. As an example, if a compositional, physical or other property is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

The term "or", unless stated otherwise, refers to the listed members individually as well as in any combination.

Definitions

"Polymer" means a polymeric compound prepared by polymerizing monomers, whether of the same or a different type. The generic term polymer thus embraces the term homopolymer, usually employed to refer to polymers prepared from only one type of monomer, and also embraces the term interpolymer. "Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Composition", "formulation" and like terms means a mixture or blend of two or more components. In the context of a mix or blend of materials from which a pre-preg or other article of manufacture is fabricated, the composition includes all the components of the mix.

The term "comprising" and its derivatives are not intended to exclude the presence of any additional component, step or procedure, whether or not the same is specifically disclosed. In order to avoid any doubt, any process or composition claimed through use of the term "comprising" may include any additional steps, equipment, additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. A method for forming a polyurethane foam, the method comprising contacting a polyisocyanate with a polyol composition comprising at least one natural oil based polyol, having a hydroxyl number of 50 to less than 100 and which is the reaction product of at least one monomer selected from the group consisting of hydroxymethylated fatty acids, hydroxymethylated fatty acid esters and combinations thereof and at least one initiator compound, and at least one poly(propylene oxide) polyol having an equivalent weight of no greater than about 1200 Da, in the presence of from 0.12 to no greater than 0.2 parts per hundred parts by weight, based on the weight of the polyol composition, of a tin-based catalyst, a blowing agent and a surfactant, under conditions in which a polyurethane foam is formed, wherein the polyol composition is free of non-natural oil based polyols formed from alkylene oxides other than propylene oxide and the at least one natural oil based polyol comprises no greater than 5 weight percent of the polyol composition, such that the tin processing window for the foam is broader and extends to lower tin catalyst concentrations relative to a corresponding natural oil based polyol-free foam formed using an identical method except the polyol composition used to form the corresponding natural oil based polyol-free foam comprises only the at least one poly(propylene oxide) polyol, wherein the polyurethane foam is an open cell foam.

2. The method of claim 1, in which the at least one poly(propylene oxide) polyol has an equivalent weight of no greater than about 1000 Da.

3. An open cell polyurethane foam made according to the method of claim 1.

4. The method of claim 1, in which the polyol composition comprises a single poly(propylene oxide) polyol.

5. The method of claim 1, in which the at least one monomer is a hydroformylated vegetable oil.

\* \* \* \* \*